Dec. 15, 1931.　　　　P. T. LENNON　　　　1,836,807
GRINDER
Filed June 22, 1927
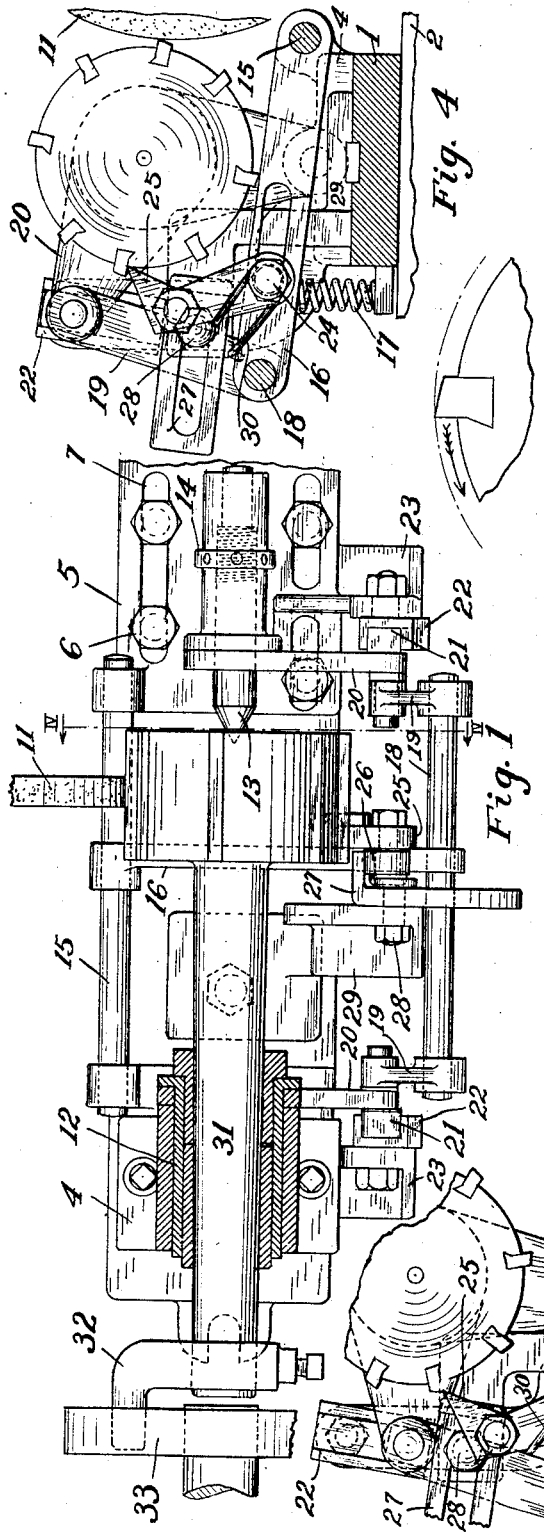
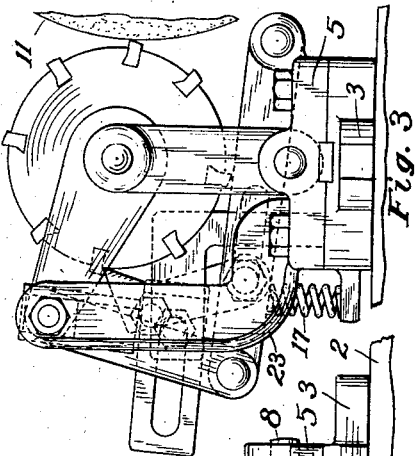
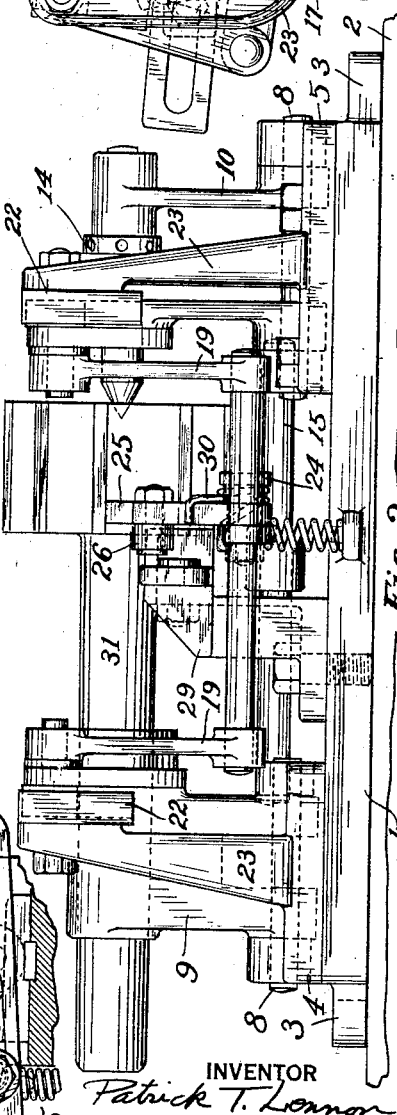
INVENTOR
Patrick T. Lennon
BY
Richey & Watts
ATTORNEYS Patented Dec. 15, 1931

1,836,807

UNITED STATES PATENT OFFICE

PATRICK T. LENNON, OF CLEVELAND, OHIO, ASSIGNOR TO THE KELLY REAMER COMPANY, A CORPORATION OF OHIO

GRINDER

Application filed June 22, 1927. Serial No. 200,571.

This invention relates to improvement in attachments for grinders and the like.

Heretofore many special grinders and attachments for grinders have been provided for the purpose of producing or sharpening cutting edges on multi-edged tools, such, for instance, as reamers.

It has long been recognized that if a cutter could be so shaped that the cutting edges thereon were at a greater radial distance from its axis than any other part of its periphery, friction between the cutter and the article being operated upon would be reduced, and power and time thus saved.

This radial clearance, or the space between the actual periphery of the cutter blade and a cylindrical surface passing through the cutting edges, has been frequently obtained by so presenting the blade to the grinding wheel that the cutting edge will be slightly in advance of the line between axes of reamer and wheel, and so the periphery of the blade was ground to a concave form. Apparatus has also been provided in which the blade is moved circumferentially and the grinding wheel simultaneously advanced relative thereto, providing a convex peripheral surface on the blade with some radial clearance. Machines for achieving this result have been provided with means, such as eccentrics, for periodically advancing the grinding wheel relative the blade. While this method of providing a radial clearance produces a stronger blade than that of providing it with a concave peripheral surface, machines of this type were adapted only to the grinding of cutters in which the blades were evenly and equally spaced about the periphery.

As it is customary in reamers having axially extending blades to space the same unevenly in order to prevent chatter in service, machines of the type above described have been found unsatisfactory. Even in cases where the feed has been controlled by cams or the like, while the machine may satisfactorily grind one particular form of cutter, cutters of other makes, or other cutters of the same make made with cutting edges slightly differently arranged, could not be sharpened thereby.

By the application of my invention, it is possible to grind reamers, cutters, or the like, having peripheral blades in which the blades are not arranged uniformly according to any definite plan, to produce a convex surface on the blades, and so provide a desired radial clearance.

The invention will be better understood from the description of one practical embodiment thereof illustrated in the accompanying drawings, in which, Figure 1 is a plan view of an attachment for a grinding machine, Figure 2 is a front elevation thereof, Figure 3 is an end elevation taken from the right hand end as illustrated in the drawings, Fig. 4 is a transverse section taken on the line IV—IV of Figure 1, Figure 5 is a view similar to Figure 4, but showing the parts in the position which they occupy when just completing the grinding of a particular tooth, and Figure 6 is an enlarged fragmentary section showing the clearance provided on a cutting blade.

As reamers, even when the blades are unevenly arranged about their periphery, have them arranged in pairs, the members of each pair being diametrically opposite, the blade opposite that being ground may be, and in the embodiment illustrated is shown as, used to control the feed of the work relative the grinding wheel, although the blade which is being ground could be used to equal advantage for this purpose.

The fixture illustrated comprises a base 1, adapted to be mounted on the table 2 of any suitable grinder and provided at its ends with apertured lugs 3 through which bolts may be passed to secure the base in place. Secured to the upper surface of the base are bearing members 4 and 5, which may be conveniently secured by cap screws 6, or the like, which may pass through slots 7 in either or both bearing members thereby rendering the same adjustable longitudinally of the base.

The bearing members have longitudinally aligned apertures for receiving pivot pins 8 upon which a pivoted headstock 9 and footstock 10 may rock toward or away from the grinding wheel 11 of the grinder. This rocking motion constitutes the feed by which the radial clearance on the tooth of the cutter is produced.

The upper portion of the headstock is formed to receive a bushing 12 in which the shank of the reamer may be directly received and rotate or which may receive collets or the like for holding different reamer shanks. The upper end of the footstock, in longitudinal alignment with the center of the bushing, is provided with a longitudinally adjustable dead center 13, which may be adjusted by being provided with a threaded shank and nut 14, as shown.

A stationary pivot 15 is supported by the bearing members at the side of the fixture adjacent to the grinding wheel, and carries a lever 16 which is normally retained in an elevated position, as shown in Figure 4, by a spring 17. The free end of the lever carries a rod 18 extending longitudinally of the fixture. Pivoted upon the ends of the rod are upwardly extending links 19 which are pivoted at their upper ends to cranks 20, the other end of the cranks being pivoted upon the head and footstock respectively. The pivots connecting the links 19 with cranks 20, are extended toward the adjacent end of the fixture to constitute crossheads 21 slidable in guideways 22 adjustably carried by stationary arms 23 which may conveniently be integral with the bearing members 4 and 5.

It will be seen that with the guide members 22 adjusted as shown in the drawings, that when the lever 16 is moved downwardly, this motion is transmitted through links 19 to the ends of cranks 20, and as the motion of pivot and cross head 21 is in a rectilinear path, lying within the circle which it would transcribe if revolving freely about the center of the stock, this motion forces the head and footstocks simultaneously toward the grinding wheel 11, and so provides the desired feed.

The lever 16 carries an adjustable pivot, shown as a bolt 24, movable along a slot in the lever, upon which pivot is an upwardly extending actuating strut or pawl 25, adapted to be engaged by the teeth of the reamer. The upper end of the strut is provided with a roller 26 engaging an adjustable guide consisting of an L-shaped member 27 secured by a slot and bolt 28 to a stationary standard or bracket 29 upon the base of the fixture. The strut is urged toward the reamer by a spring 30.

The operation of the device is as follows:

A reamer is inserted in the fixture with its shank 31 extending through the bushing in the headstock and is provided at its outer end with a dog 32 engaging a rotatable part 33 of the grinder, so that the reamer will be continuously rotated during the grinding operation. The dead center 13 is adjusted to support the other end of the reamer. The guides 22 are adjusted so that a very light cut will be taken off the cutting edge of the blades, and guide 27 and pivot 24 are adjusted so that strut 25 will be engaged by the tooth opposite that being ground at about the time the latter comes in contact with the grinding wheel, and at such an angle that the downward motion of the strut will cause it to be rocked to the left, as shown in the drawings, to clear the edge of the tooth engaged when the opposite tooth has been ground across its entire width.

The grinding wheel 11 is now set in rotation, as is the rotating part 33 and consequently the reamer, and the feed by which the grinding wheel and reamer are moved longitudinally or axially of the grinding wheel relative each other is also thrown in.

As the reamer rotates, teeth are successively brought into contact with the grinding wheel and as each tooth engages the grinding wheel, the head and foot stock start their movement toward the grinding wheel under the downward pressure of the opposite tooth upon the strut and the corresponding motion of the stocks produced through the levers, links and cranks.

As soon as the grinding wheel has traversed the entire width of the tooth being ground, the actuating strut slips off the opposite tooth and springs 17 and 30 return the parts to their original position where the feed will be repeated by the succeeding tooth.

While I have described the illustrated embodiment of my invention in some particularity, obviously many modifications and variations will readily occur to those skilled in the art, and I do not, therefore, limit myself to the precise details shown and described, but claim as my invention all the embodiments thereof coming within the scope of the appended claims.

I claim:

1. In combination with a grinder, a pivoted headstock and a pivoted footstock for supporting a multi-bladed cutter adjacent to the grinding wheel, feed mechanism for rocking said stocks toward the grinding wheel, a strut engageable successively with the teeth of the cutter and transmitting motion received therefrom to the feed mechanism, means for rotating the cutter, and means for relatively moving the cutter and grinding wheel longitudinally.

2. A work suport for use in combination with a grinder and adapted to be supported adjacent to the grinding wheel of the grinder, comprising means for rotatably supporting a multi-bladed cutter with its axis extending parallel to that of the grinding wheel, means for rotating the cutter, means for feeding the cutter toward the grinding wheel operated by successive blades of the cutter, and a spring for retracting the cutter from the grinding wheel.

3. Grinding apparatus comprising a grinding wheel, a support for a multi-bladed cutter adjacent thereto and arranged to support the cutter with its axis parallel to that of the grinding wheel, means for rotating the cutter, means for axially translating the cutter and grinding wheel relative to each other, and a feed actuated by successive teeth of the cutter moving the same toward the grinding wheel.

4. A fixture for grinders which comprises a base adapted to be supported upon the table of a grinder, a support for a multi-bladed tool movably carried by said base and rotatably supporting the tool, and feed means moving the support toward the grinding wheel and actuated by the blade of the tool diametrically opposite that being ground.

5. In combination with a grinding mechanism including a grinding wheel, a support for a multi-bladed cutter adjacent the grinding wheel, means for rotating the cutter, means successively engaging the blades of the cutter diametrically opposite the grinding wheel, motion-transmitting mechanism associated therewith moving the cutter toward the grinding wheel, and resilient means withdrawing said blade engaging means to its original position and constituting a reverse feed.

6. A fixture for use on a grinder having a grinding wheel which comprises a base adapted to be carried by the table of the grinder, a headstock and a footstock pivoted to said base to support a multi-bladed cutter adjacent the grinding wheel, feed mechanism for rocking said stocks toward the grinding wheel, a strut engageable successively with the blades of the cutter opposite the point of contact of the cutter with the grinding wheel, and transmitting motion received from said blades to a feed mechanism, means for rotating the cutter and resilient means for returning said feed means to its original position away from the grinding wheel when the strut is released by a blade of the cutter.

7. A fixture for use on a grinder having a grinding wheel comprising a base adapted to be secured to the movable table of the grinder, a headstock and footstock pivoted thereto and adapted to support a multi-bladed cutter, guides adjustably carried by said base, arms pivoted to said headstock and footstock at one end and having their other ends slidable in said guides, a strut engageable by the blades of the cutter opposite their point of contact with the grinding wheel, link-work between said strut and arms causing the arms to travel along said guides as the strut is moved by a blade of the cutter, and spring means returning said arms, strut and associated mechanism to their original position when the strut passes the edge of a blade.

In testimony whereof I hereunto affix my signature this 16th day of June, 1927.

PATRICK T. LENNON.